Fenton M. Wood
Mahan L. Reeme, Jr.
Berry G. Price
INVENTORS

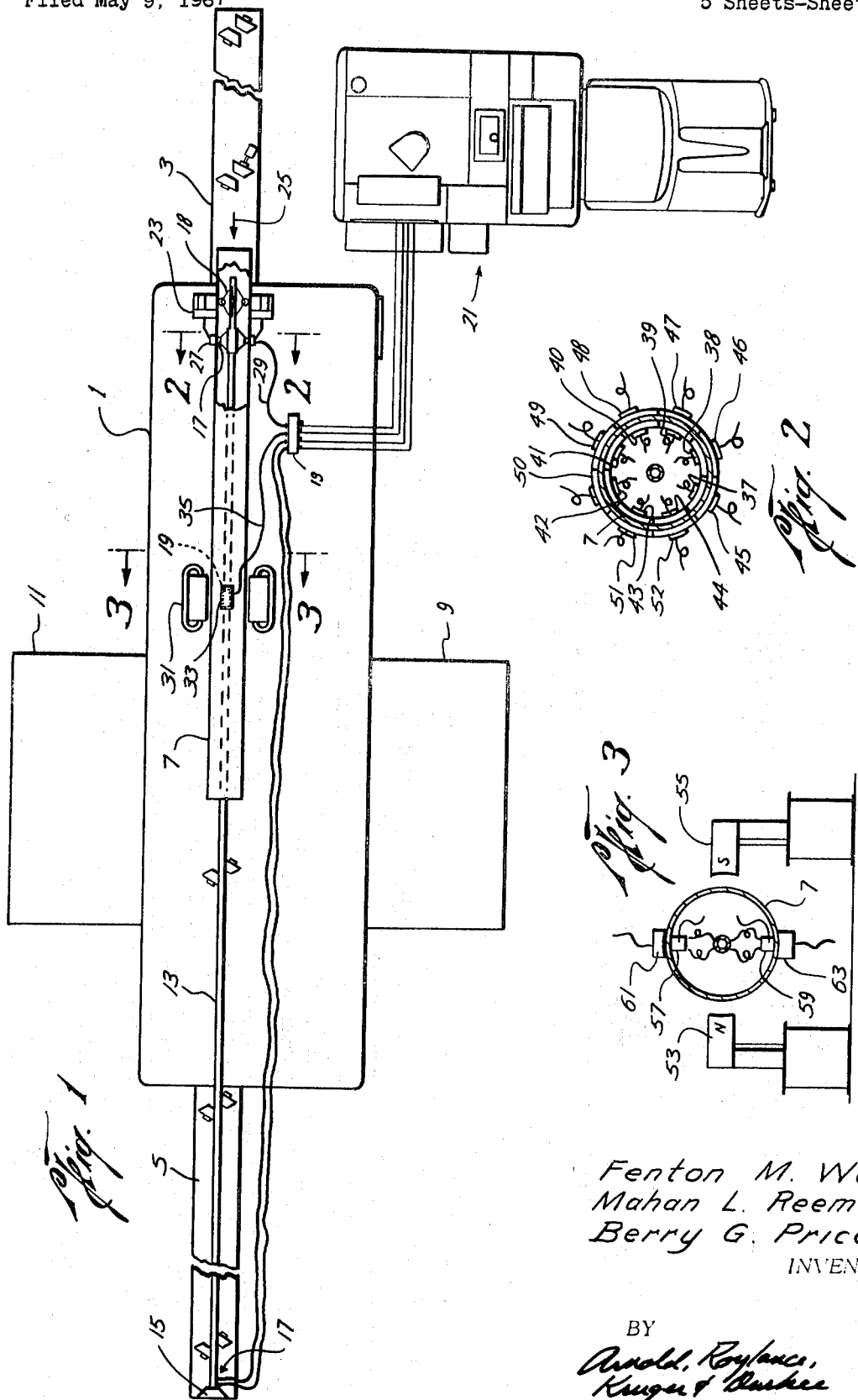

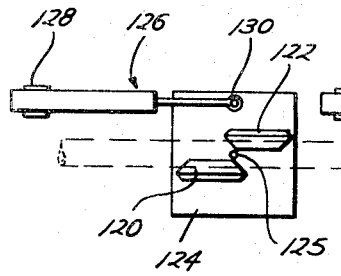
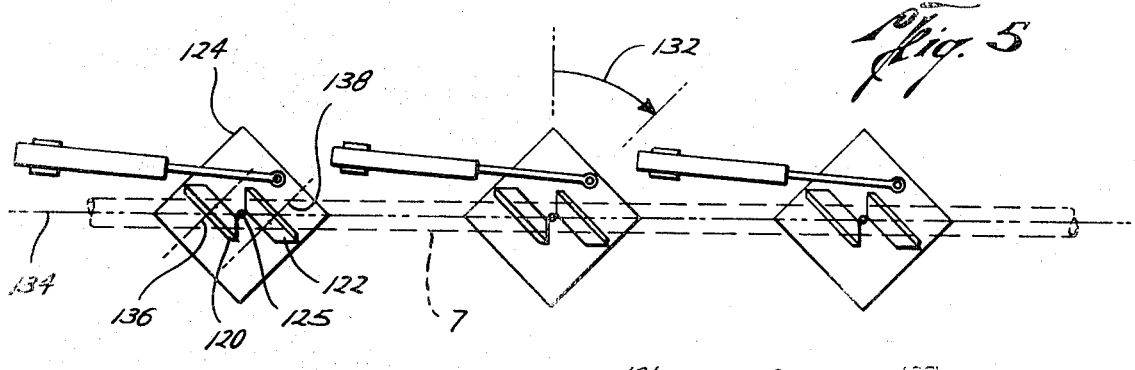
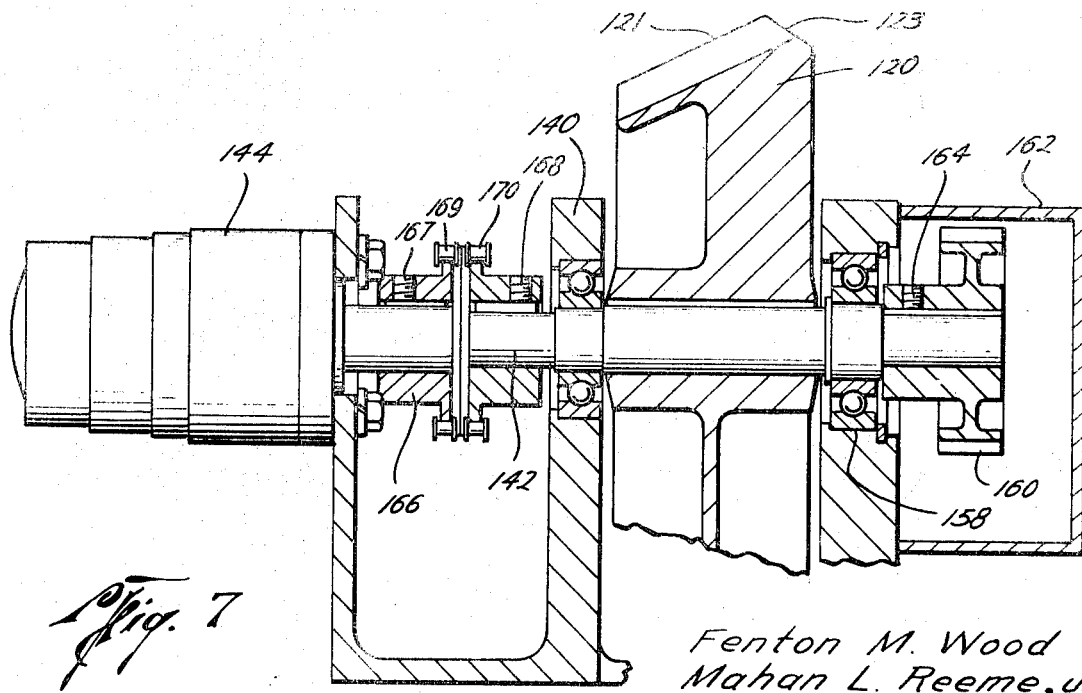

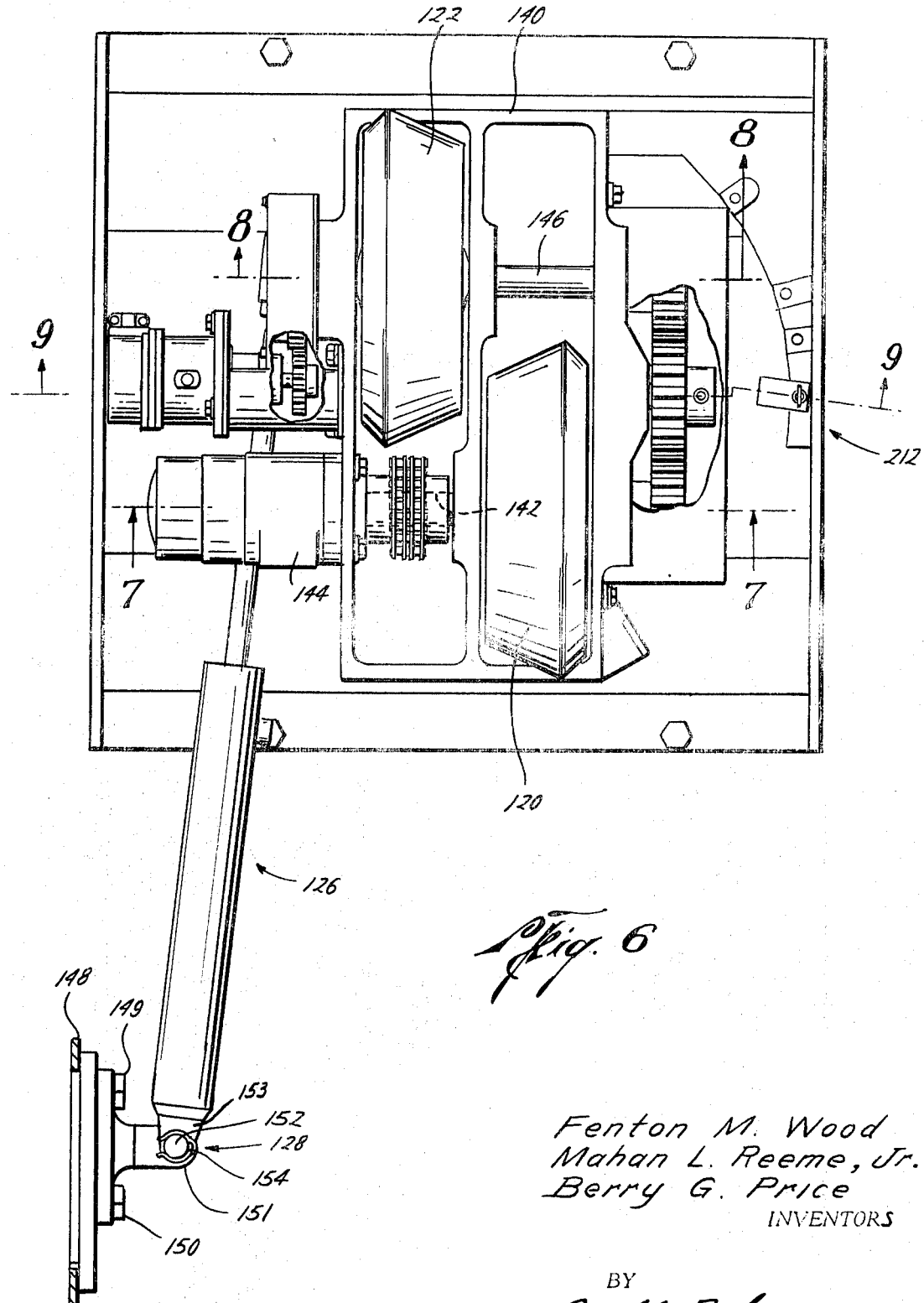

BY
Arnold, Roylance,
Kruger & Durkee
ATTORNEYS

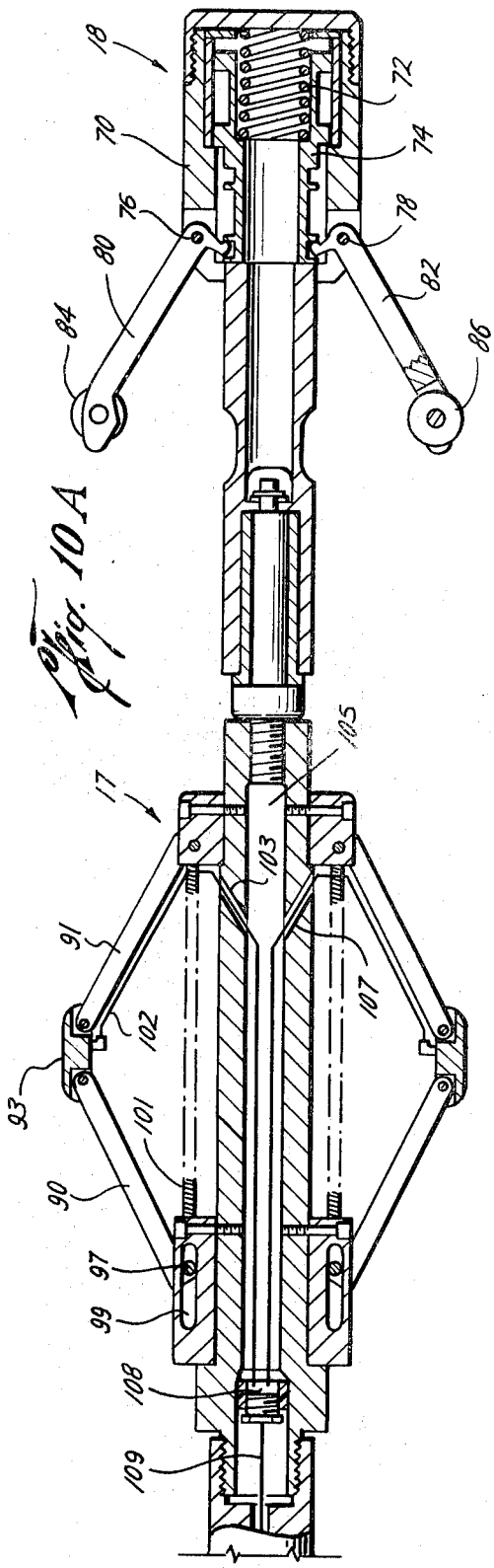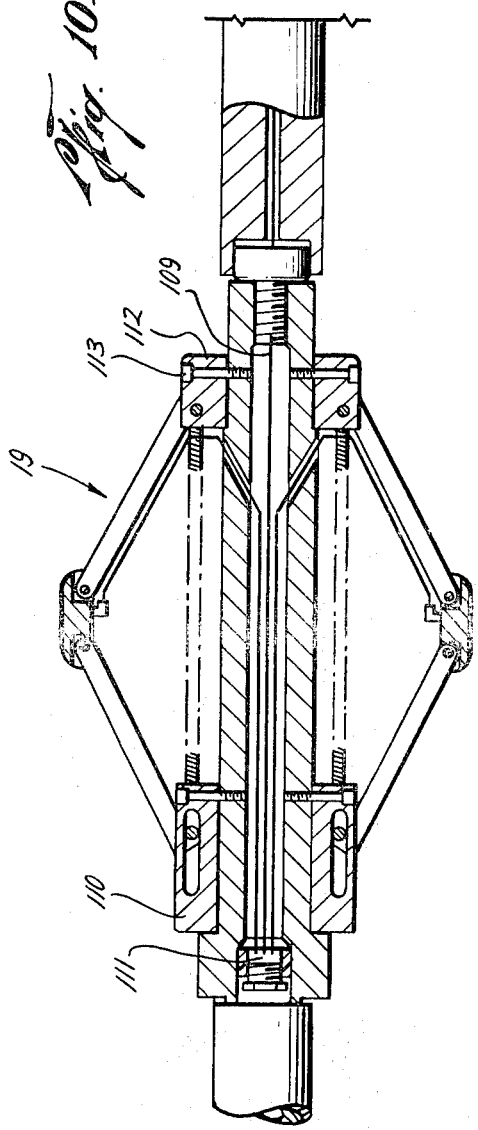
Fenton M. Wood
Mahan L. Reeme, Jr.
Berry G. Price
INVENTORS
BY
Arnold, Roylance,
Kruger & Durkee
ATTORNEYS

United States Patent Office 3,535,623
Patented Oct. 20, 1970

3,535,623
METHOD AND APPARATUS FOR INSPECTING A TUBULAR MEMBER FOR INSIDE AND OUTSIDE ANOMALIES UTILIZING MAGNETIC FIELD DETECTOR MEANS POSITIONED ON BOTH THE INSIDE AND OUTSIDE SURFACES
Fenton M. Wood, Sugarland, and Mahan L. Reeme, Jr., and Berry G. Price, Houston, Tex., assignors to American Machine & Foundry Company, New York, N.Y., a corporation of New Jersey
Filed May 9, 1967, Ser. No. 637,281
Int. Cl. G01r 33/12
U.S. Cl. 324—37
10 Claims

ABSTRACT OF THE DISCLOSURE

The present invention pertains to methods of inspecting ferromagnetic tubular members and to apparatus uniquely suitable for performing the methods. Basically, the following four inspection operations are performed in one integrated operation: inside flux leakage scanning in an established longitudinal field, outside surface flux leakage scanning in an established longitudinal magnetic field, inside surface flux leakage scanning in an established circumferential magnetic field, and outside surface flux leakage scanning in an established circumferential magnetic field. To perform this inspection in a preferred manner, a rigid lance is mounted at an end and spaced from its free end are suitable centralizers, a circumferential set of inside surface detection shoes for detecting a longitudinal field, and one or more inside surface detection shoes for detecting a circumferential field. Opposite the inside detection shoes in each case are comparable outside surface shoes. Also mounted with the outside surface longitudinal detection shoes is a longitudinal flux establishing means and with the outside surface circumferential detection shoes is a circumferential flux establishing means. Driven rollers longitudinally translate a tubular member past the longitudinal flux establishing means and related detection shoes. The driven rollers are then adjusted to spirally translate the tubular member past the circumferential flux establishing means and related detection shoes. Pairs of offset rollers driven together and turnable interchangeably perform the longitudinal and spiral translating of the tubular member.

---

This invention relates to method and apparatus for inspecting elongated members and, more particularly, to method and apparatus for nondestructively inspecting by means of electromagnetic inspection elongated, tubular goods, such as pipe, oil well production tubing, and the like, from both the outside surface and the inside surface and for a plurality of possible discontinuities, all in one continuous operation.

Many techniques and apparatus have been employed in the past for magnetically or electromagnetically detecting the existence of a flaw or other defect in tubular members and, in addition to mere detection, determining someing of the nature of the detected defect. Both residual and active direct current magnetism have been employed, as well as the employment of alternating current magnetic fields for inspecting the surfaces of the members for defects. (This type of electromagnetic inspection is known as "eddy current" inspection.) Detection in each case has been conventionally via various coil arrangements peculiarly sensitive to a flux leakage pattern caused by a distortion of the wall of the tubular member by a defect having a dimension and alignment related to the flux leakage pattern it causes. For instance, a defect may be in the form of a partial breach in the wall having an elongated dimension in a certain direction, normally either longitudinal with respect ot the axis of the tubular member or transverse to the axis. Such a breach reduces the wall thickness opposite the breach and causes a flux field established transverse to the breach to leak outside of the limits of the wall. This flux leakage pattern is detectable and indicative of the depth, length and orientation of the breach.

In the case of AC or eddy current detection, different frequencies may be used to inspect conditions occurring in areas of the inspected member at various distances from the surface thereof, the higher the frequency the greater the concentration of the electric field and the magnetic field related thereto in the thickness area near the surface of the wall. A defect deeply within the wall and outside of the concentrated flux area will not have much effect on the AC magnetic field. On the other hand, a defect of the same nature in the surface (where the field concentration occurs) will have a materially greater effect.

As examples of various methods and apparatus that have been employed utilizing to some degree magnetic or electromagnetic inspection are the following: Pats. 2,650,344 and 2,685,672, which show suitable coils and related apparatus for detecting flux leakage; Pat. 2,881,387 which shows the use of a coil of one size for detecting flux leakage and of another for detecting eddy current changes (indication of near surface defects); Pat. 3,066,254, which shows an outside surface, active magnetizing means for establishing a longitudinal field and a detector operating with respect thereto; Pat. 2,878,447, which shows an active prod-type magnetizing means for establishing a circumferential field an an outside surface circumferential field detector; Pats. 2,989,692 and 2,995,701, which show a helical (combined longitudinal and rotational) movement of the inspected member with respect to outside surface magnetizing and inspecting means; patent application Ser. No. 504,567, and now abandoned, and replaced by Ser. No. 806,758, which shows rotating inspecting equipment for establishing a circumferential field and including detecting means operating in connection therewith and simultaneous longitudinal translating equipment for moving the inspected member with respect to the inspection equipment; Pat. 3,202,914, which shows a flux area and depth inspection detecting means for use adjacent a surface of the inspected member for indicating types of defects and estimating the surface in which they are likely to occur; Pat. 3,209,243, which shows a magnetic detector means mounted for internal surface scanning; Pat. 3,225,293, which shows an internal surface, active magnetizing means for establishing a longitudinal field and detector means; and Pat. 3,317,824, which shows internal surface scanning equipment employing a two-frequency eddy current scheme.

As will be shown, none of these schemes perform to accomplish the results of the method and apparatus herein disclosed.

Most new pipe for oil wells (e.g., drill pipe and casing) is manufactured and purchased in accordance with specifications developed by the American Petroleum Institute (API), a voluntary professional organization of the petroleum industry. In a standard purchasing agreement for an order of pipe, in addition to size, quantity and material, the buyer will normally specify that the pipe delivered by the seller must meet certain quality standards. The quality standards are generally set out in these contracts by reference to an API specification.

Evaluation of the quality of the pipe delivered under these contracts is generally performed by a third party, who uses inspection equipment and applies inspection techniques sufficiently sophisticated for use at a well site where the pipe is delivered. The apparatus and techniques must be capable of detecting invisible seams, slugs and other defects that reduce the strength of the pipe as specified by the applicable API specification pertaining to the job.

As the state-of-the-art in pipe-making improves and the specifications for quality are tightened, the requirements for more sensitive and reliable inspection apparatus and techniques must be met by improvements that meet these more stringent requirements. For example, API–5A specifies that both outside surface and inside surface seams, cracks and other defects exceeding 12½ percent of the tabulated wall thickness are injurious and therefore must be rejected. Evolutionarily, API–5AX specifies that, at least with regard to outside surface defects, seams and other defects exceeding 5 percent of the tabulated wall thickness must be identified and rejected or repaired.

A further evolutionary step anticipated by API specifications of the future is that pipe must be rejected if a defect exceeds 5 percent of the tabulated wall thickness, regardless of from what side the defects may initiate. Another tightening of the API specification may require the rejection of pipe when the defect exceeds a percentage of tabulated wall thickness less than 5 percent, for instance, on the order of 2 percent.

The equipment in the prior art, although suitable for meeting the inspection requirements of the API specifications currently referred to in most transactions, are not suitable for inspecting under the tightened inspection requirements of the expected evolutionary API specifications of the future. In addition, the multiple inspections that must be performed by presently available equipment to inspect thoroughly for all possible defect dimensions and alignments make high-speed quality inspection impossible.

Generalizing with regard to the presently available prior art equipment, inspection has generally been performed by equipment located opposite a single surface of the inspected member. Although techniques through utilizing coil dimensions of different sizes and through the use of different frequencies can determine and reveal something about defects occurring in the side opposite the one where the inspection equipment is located, there is little doubt that the greatest sensitivity for inspecting the surface for defects is via a scanner used next to that surface.

Also, a single inspection step has generally been performed to detect for defects aligned only in one direction, e.g., longitudinally or circumferentially. Normally, the member is magnetized in the desired direction, and detection coils are passed over the surface in that magnetized direction. As a compromise in an attempt to detect defects aligned both ways in a single step, helical or spiral scanning has been used. Defects are sometimes discovered, provided that in addition to being principally aligned in either a longitudinal or circumferential direction a partcular defect also has an appreciable dimension in the helical or spiral direction. Obviously, defects are overlooked by such a technique.

To overcome the slowness of complete inspecting by prior art methods (using a plurality of inspection equipments and multiple inspecting steps) and to provide a speed comparable to or better than the helical scanning techniques now in use, the method and the apparatus disclosed herein generally comprise longitudinally translating by appropriate drive means a tubular member to be inspected with respect to the inspection equipment comprising the various means subsequently identified, establishing at a first location and in a first portion of the inspected member a longitudinal magnetic field by appropriate means, inspecting the first portion simultaneously with external detection apparatus and with internal detection apparatus, establishing by appropriate means a circumferential magnetic field at a second location and in a second portion of the inspected member axially located from the first portion, and simultaneously with external detection apparatus and internal detection apparatus inspecting the second portion.

It may be readily seen that the inspection process just described may be performed in a single inspection pass of the inspected member past the inspecting equipment or by sequential passes (once past the longitudinal magnetic field establishing and detecting means and then past the circumferential magnetic field establishing and detecting means). It should also be noted that it is immaterial if the first inspection step is with respect to a longitudinal field or a circumferential field, provided the second step is with respect to the other type of established field.

Additionally, it may be that during one pass of the inspected member with respect to the inspection equipment, longitudinal movement only is desired, and during a second pass of the inspected member a helical, mostly circumferential movement is desired to permit ease of circumferential scanning. Uniquely suitable selectable longitudinal and rotational equipment is disclosed herein for effecting versatile movement of this nature.

An advantage of the disclosed apparatus is that the same quality of inspection may be performed in inspecting for defects initiating in either the outside or the inside surface of the inspected member, without regard to detection being more sensitive to defects in the near surface to the inspecting apparatus than to defects in the opposite surface.

Another advantage in the present apparatus is that a detected defect is automatically and positively "proved up" as being an outside surface defect or an inside surface defect without further investigation or examination of a developed signal, since separate detection means is used for inspecting each surface, thereby making it possible to record a separate and correlated output for each surface detection means.

Yet another advantage of the disclosed apparatus is that inspection therewith allows current API specifications to be met with a large margin of safety. Also, the disclosed apparatus advances the state-of-the-art to permit API quality specifications in the future to state more stringent requirements without being limited by previously available apparatus.

So that the manner in which the above recited advantages of the invention, as well as others which will become apparent, are attained can be understood in detail, more particular description of the invention briefly summarized above may be had by reference to the embodiments thereof which are illustrated in the appended drawings, which drawings form a part of the specification. It is to be noted, however, that the appended drawings illustrate only typical embodiments of the invention and therefore are not to be considered limiting of its scope, for the invention may admit to other equally effective embodiments. In the drawings:

FIG. 1 is a plan schematic view of an embodiment of the apparatus shown performing inspection of a tubular member.

FIG. 2 is a cross-sectional view taken at line 2—2 shown in FIG. 1.

FIG. 3 is a cross-sectional view taken at line 3—3 in FIG. 1.

FIG. 4 is a plan view of a part of the embodiment of the apparatus shown in FIG. 1 performing a functional step of the inspection operation.

FIG. 5 is a plan view of the same part of the apparatus shown in FIG. 1 performing a functionally different step of the inspection operation from that shown in FIG. 4.

FIG. 6 is a detailed view of one set of rollers shown in the illustrated embodiment shown in FIG. 5.

FIG. 7 is a cross-sectional view taken at line 7—7 in FIG. 6.

FIG. 10 is a cross-sectional view of the end of the lance shown in the embodiment illustrated in FIG. 1.

Figure 8:
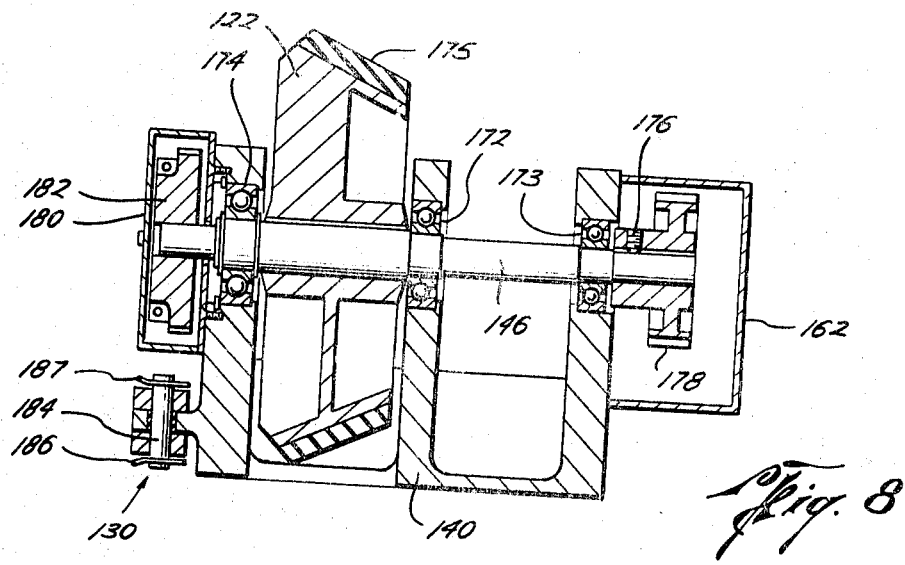
FIG. 8 is a cross-sectional view taken at line 8—8 in FIG. 6.

Now turning to the drawings and, first, to FIG. 1, inspection apparatus is generally shown which is mounted in a van 1. Racks 3 and 5 are set up as shown, rack 3 being attached to one end of van 1 and rack 5 being attached to the other end. On each of the racks are a plurality of pair sets of rollers, described in detail below, for translating ferromagnetic pipe 7 to be inspected with respect to the various equipment located within the van. Prior to installation racks 3 and 5 may be stored on wings 9 and 11 of the van, which wings fold down at the inspection site as shown.

Generally, mounted at one end of one of the racks, for convenience of discussion rack 5, is a lance 13 fixedly secured at mounting 15. This lance is sufficiently long that pipe 7 may be positioned and moved axially completely thereover, such that the end of the lance will project past the limits of the rear end. Secured on lance 13 are a plurality of centering means 18 and two groups of inspection detection equipment, all described in detail below. The centering means may merely be in the form of a number of sets of outwardly urged, contacting arms three or more in number, the net resulting effect of which is the substantial uniform centering of the pipe being inspected with respect to the inspecting equipment located both inside the pipe (secured to the lance) and located about the pipe. Although only one centering means 18 is shown in FIG. 1, other such means are located along the lance to perform similar centering.

Internal detection means 17 for inspecting the flux leakage in an established longitudinal field from the inside surface of the pipe is located just behind (away from the lance end) centering means 18 shown. Axially displaced further from the end of lance 13 some distance from detection means 17 is internal detection means 19, particularly suited for detecting flux leakage in a circumferential magnetic field from the inside surface of the pipe. The exact location of inspecting means 17 and 19 with respect to the magnetizing means establishing the respective longitudinal and circumferential fields is discussed more in detail with respect to those magnetizing means. It should be noted, however, that each means 17 and 19 produces at least one meaningful signal of the flux leakage detected, which signals are converted to electrical energy and are supplied via an appropriate wire or wires located within lance 13, finally leaving the lance at end 17, near mounting 15 where lance 13 is secured. These wires may conveniently be brought to station 19 located within van 1 and/or may be brought outside the van to an accompanying equipment console, which may be located conveniently in vehicle 21. This console may, in turn, conveniently indicate, display, or permanently record the resulting signals in chart or strip form.

Magnetizing means 23 for establishing the longitudinal field within a first zone which at any given time includes a constantly changing first portion of the pipe for subsequent detection by detection means 17 is located slightly toward the end of the lance from detection means 17. Longitudinal magnetizing means 23 establishes a residual magnetic flux running lengthwise in the wall of the inspected member or pipe 3 and such that as the pipe moves through the equipment in direction 25 from the end of lance 13 the portion of the pipe passing opposite detection means 17 will be magnetized. Located opposite detection means 17 adjacent the outside surface of the pipe is detection means 27, similar to means 17, for detecting flux leakage emanating from that surface.

It is interesting to note that even though a breach in the wall from one side reduces the overall thickness of the wall at that point and therefore causes flux leakage from both surfaces of the pipe, the effect of such leakage from the wall surface in which the breach occurs is much more pronounced and definitive than the flux leakage resulting from the other side. Moreover, since flux is being simultaneously detected from both the inside surface and the outside surface, this is a definite indication that the breach is in the surface where the flux leakage is the greater.

The electrical signal or signals developed by outside detection means 27 is taken via wire 29 directly to station 19 and/or to the console located in vehicle 21.

Similar to the longitudinal inspection equipment just described, axially displaced therefrom, is a magnetizing means 31 for establishing a circumferential field in the wall of pipe 7 at a second location or zone, wherein a constantly changing second portion of the pipe is included. In a common transverse plane of pipe 7 at the second location, are inside surface detecting means 19 and outside surface detection means 33. When pipe 7 is rotated about its axis (as well as being translated longitudinally past the equipment), inspections means 19 and 33 simultaneously scan the inside and outside surfaces of the pipe, respectively, detecting flux leakage emanating from the respective surfaces, similar to the longitudinal flux leakage detection discussed above. An electrical signal is taken from the outside inspection means 33 via wire 35 which is connected into station 19 and through station 19 to the console located in van 21. The signal from the inside detection means is taken via a wire or wires located within the lance, leaving the lance at end 17 as before for connection to station 19 within the van and/or to a console within vehicle 21.

In brief summary of operation, establishment of longitudinal flux and detection of longitudinal flux leakage is occurring in one location (a first portion of the pipe) while subsequently establishment of circumferential flux and detection of circumferential flux leakage is occurring in another or second portion of the pipe.

In a preferred more complete method of operating the equipment, longitudinal translating rollers located within racks 3 and 5 translate pipe 7 longitudinally past longitudinal field establishing means 23 and detection means 17 and 27, thereby inspecting the outside and inside surface for transverse anomalies or defects. The pipe then moves all the way past the circumferential inspecting equipment comprised of circumferential magnetizing means 31 and inspecting means 19 and 33 (which is not then operating). The means for translating the pipe within racks 3 and 5 is adjusted for helical rotation of the pipe, the longitudinal direction being opposite to direction 25. The pipe moves past magnetizing means 31 and detecting means 19 and 33 to detect defects aligned longitudinally or axially with respect to pipe 7 (transverse to the established circumferential field). It should be noted that the circumferential field erases the residual longitudinal field causing it to have no effect at this time.

Alternate to this two way pass is a single helical pass first through the longitudinal field inspection equipment and then through the circumferential field equipment. However, since the pipe must be moved back through the inspection equipment for removal anyway, the system of longitudinal movement through the longitudinal field equipment and helical movement back through the circumferential equipment is preferred.

Also, it should be noted that erasing equipment (not shown) may be included between the longitudinal field inspection equipment and the circumferential field inspection equipment, if desired. However, it has been observed that the circumferential field inspection equipment satisfactorily removes the effects of the longitudinal field without the need of a separate erasing means.

Since at least four wires lead from the inspection equipment to station 19 and/or the vehicle console, each from a different detection means, namely, detection means 17, 27, 19 and 33, four separate graphs or charts may be made therefrom, one with respect to transverse inside surface defects, one with respect to transverse outside surface defects, one with respect to inside surface longitudinal defects, and finally one with respect to outside surface circumferential defects. Furthermore, since the inside and outside surface scanning for defects oriented in a particular alignment are performed at the same time, there is automatic correlation of the produced graphs. For example, the graphs made from the signals developed from inspection means 17 and 27 are correlated together, and the graphs made from the signals developed from inspection means 19 and 33 are correlated together.

So that the complete inside and outside surfaces, rather than just a portion, may be inspected with a single pass for each type of defect alignments, inspection equipment for the detecting leakage in the longitudinal flux may be used as shown in FIG. 2, which is a cross-sectional view of the detection means 17 and 27. Means 17 comprises a plurality of detection shoes or individual surface area detectors, illustrated as eight in number and numbered 37–44. Similarly, detection means 27 comprises a plurality of shoes, also illustrated as eight in number and numbered 45–52. In each case, the inspection shoes may overlap to cover the entire circumferential area respectively of the inside and outside surfaces of pipe 7 being inspected.

A cross-sectional schematic view of a preferred form of the circumferential inspection equipment appears in FIG. 3. Electromagnetic poles 53 and 55 establish a circumferential field within the wall of pipe 7. Detection means 19 typically comprises an inspection shoe 57 and an inspection shoe 59 which are outwardly urged against the inside surface of the pipe 7. Similarly, detection means 33 comprises an inspection shoe 61 and an inspection shoe 63 which scan the outside surface of pipe 7 diametrically opposite shoes 57 and 59, respectively. When pipe 7 is rotated about its axis, shoes 57, 59, 61 and 63 scan the entire inside and outside surfaces of the pipe to detect flux leakage patterns resulting in the circumferential field established by poles 53 and 55. Since, as explained above, pipe 7 is moved longitudinally as well as circumferentially during circumferential inspection, by having two shoes 57 and 59 on the inside and two shoes 61 and 63 on the outside, it is easily possible to adjust the speed of longitudinal and rotational movement to scan the respective entire surface areas during one rotation of pipe 7 by overlapping the spiral scanning of the shoes. That is, the speed with which the pipe is translated longitudinally and rotated is coordinated with respect to the size of the inspection shoe so that the entire surface areas are inspected in an overlapping manner.

Although FIGS. 2 and 3 show a single lead for each inside surface inspection shoe and for each outside surface inspection shoe, it is possible that the leads from shoes 37–44 may be connected together through logic means to develop a single output. Similarly, the leads from shoes 45–52 may be connected through logic means to develop a single output. For instance, it is possible to utilize a logic circuit whereby the largest flaw in a transverse section being simultaneously scanned by eight different shoes produces a signal which is selected in preference to other signals and placed on a common line leading from the entire detection means. Such a method of detecting the largest signal produced from a plurality of simultaneous signals is well known in the art.

The physical structure of an outside surface inspection shoe suitable for operating as above described is shown in Pat. 3,170,114.

A preferred embodiment of an inside surface inspection shoe capable of operating as either a shoe 37–44 or as a shoe 57 or 59 is illustrated in FIGS. 10A and 10B, which illustrates a centralizing means 18, a pair of inside inspection shoes of means 17 and a pair of inside inspection shoes of means 19.

Located at the right end of the lance shown in FIG. 10A is a centralizer assembly comprising a blunt end housing 70 enclosing a spring 72 held in compression. Spring 72 urges against a shoulder of a sleeve 74 which is pivotally secured at junctions 76 and 78 to arms 80 and 82, respectively. Rotationally mounted at the ends of arms 80 and 82 are wheels 84 and 86, respectively, for riding on the inside surface of pipe 7 as the pipe is translated over the lance. It will be seen that as sleeve 74 slides longitudinally under urging of the spring in a rearward direction with respect to the lance, pivot junctions 76 and 78 uniformly urge arms 80 and 82 outwardly, thereby centralizing the axis of the lance concentrically with the axis of a pipe 7 being in contact on wheels 84 and 86.

Located on the lance axially behind centralizer assembly 18 is the inspection means for detecting flux leakage in the established longitudinal magnetic fields. Shown in cross-section are only two of the eight shoes mentioned with respect to FIG. 2. A typical inspection shoe comprises two arms 90 and 91 which are secured by pivot connections to the inspection shoe 93. These pivot connections allow shoe 93 to ride with ease over contours within the surface of the pipe. Located within the inspection shoe 93 are appropriate coils or other detection means for detecting longitudinal flux leakage.

Arm 91 is connected at its end opposite shoe 93 to junction 95, also a pivot-type junction. Arm 90 is similarly connected to a pivot junction axis 97. However, instead of being affixed in a single rotating place, junction axis 97 is positioned within slot 99 for longitudinal movement, thereby allowing 90 and 93 together to be moved more longitudinally than shown or closer to lance 13. A spring 101 connects joint 97 and 95 to urge shoe 93 outwardly, the inside surface of the pipe urging 93 inwardly and opposing the normal tensioning of spring 101.

A lead 102 from shoe 93 provides convenient means for taking the signal therefrom. This lead follows arm 91 to enter an internal opening 105 within lance 13 through slot 103 in the side thereof. Similarly, the lead from the other shoe shown in FIG. 10A leads to the internal opening 105 within the lance. These leads go to a connector 108, which in turn may be connected to a logic circuit at that point or may merely be connected to wires strung within the lance to be eventually connected (through connector 111 as described below) to chart or graph-making equipment.

FIG. 10B shows a typical arrangement of outwardly urging shoes which are suitable for the circumferential detecting means. For all intents and purposes, the detection means shown in FIG. 10B is similar to that shown in FIG. 10A, except the coils or other detectors therein are suitable for circumferential scanning. The internal opening of the lance at this point allows the wire or wires leading from the longitudinal detection means to pass therethrough, as shown. Actually, for purposes of illustration, a single wire 109 is shown extending from the longitudinal flux leakage inspection equipment just described and connecting to the connector 111 to which the leads from the circumferential inspection means shown in FIG. 10B are also connected. Connection to chart or graph-making equipment is the same as described above.

For ease of assembly, each individual shoe assembly may be made on a pair of mounting blocks 110 and 112, which may be secured as is convenient to lance 13 by bolts 113 at the desired locations.

Now turning to FIGS. 4 and 5 for a description of the translating and rotating means used in conjunction with the inspection just described, a pipe to be manipulated is shown in dotted section as pipe 7. Located along the pipe are a plurality of pairs of driven bevelled rollers. Three such sets of rollers are shown for convenience, each set comprised of a left roller 120 and a right roller 122.

The axis of left roller 120 is positionable to be perpendicular to the axis of pipe 7, the plane of the roller being slightly offset to the left from the axis of the pipe, as shown. The roller is basically frusto-conical in shape, its dimension gradually decreasing as it approaches the axis of the pipe. Similarly, the axis of right roller 122 is positionable to be perpendicular to the axis of pipe 7, the plane of this roller being slightly offset to the right from the axis of the pipe. The axes of the rollers are not coextensive, but rather displaced from each other along the axis of the pipe. The surfaces of the rollers do, however, form a V-shaped supporting surface for the pipe.

Each set or pair of rollers is mounted on a rotatable table mounting 124, the table mounting resting on a pivot 125 which is perpendicular both to the axis of the pipe and to the axes of the rollers (in other words, perpendicular to the paper as shown in FIG. 4). Furthermore, pivot 125 is located half way between the rollers and directly beneath the axis of the pipe.

Secured in movable relationship with respect to table 124 is piston assembly 126, a convenient means for turning the table mounting. The piston also is mounted for slight pivoting at pivot 128, the pivoting of 126 being about an axis parallel with the axis of table 124. Piston assembly 126 is secured to table 124 at pivot 130, also parallel to pivots 125 and 128. These three pivots allow the table mounting to be turned by the piston assembly, as shown in FIG. 5.

It may be seen that in FIG. 4 the piston assemblies 126 (one for each set of rollers) are in their retracted positions. This places the plane of the rollers and hence the driving surfaces of the rollers parallel with pipe 7. Assuming power is applied to the rollers turning them all in the same direction for translating the pipe, it will be seen that pipe 7 moves longitudinally with respect to its own axis without excessive spinning or rotation.

FIG. 5 shows the piston assemblies extended, thereby turning table mountings 124 through an angle 132 (a measure of the angle between the axes of the rollers and the axis of the pipe). The pistons for the various table mountings work in synchronism so that each of the roller sets is turned by essentially the same angle 132. Angle 132 is less than 90 degrees.

Axis 134 of pipe 7 is shown passing through the pivots 125 of each table mounting on which the roller sets are mounted. Notice that axis 136 of rollers 120 and axis 138 of roller 122 are positioned such that the incline-engaging face of roller 120 is now on the right side of pipe 7, and the engaging face of roller 122 is on the left side, a condition opposite from the condition existing for the FIG. 4 configuration. This means that pipe 7 still readily nestles on the face of the rollers; however, when the rollers are driven as in FIG. 4, there is a spiral or helical movement of pipe 7 with respect to the rollers, rather than a merely longitudinal movement as with FIG. 4. Such movement of pipe 7 permits the circumferential scanning described above.

Actually, the size and the spacing of the rollers is not critical so long as the pipe being inspected nestles onto the surface of the rollers and does not spin off when the rollers are driven.

FIG. 6 illustrates one form that a roller set mounted on table 124 could take. Generally, a roller 120 is mounted within a frame 140 about an axis 142, connected to a hydraulic drive motor 144. In cooperative relation as discussed above, roller 122 is mounted about an axis 146. A center portion of the frame establishes and maintains the separation between the rollers. It will be understood that the hydraulic motor 144 drives directly only roller 120 and that roller 122 is driven through a gear assembly described below.

For convenience of attachment, piston assembly 126, operatively connected to the roller pair, is permanently affixed by bolts 149 and 150 to some permanent existing channel portion of the rack to which the related roller set is secured. An extension 151 from such mounting provides pivot 128 in conventional manner together with a mating projection 153 from piston assembly 126 through which a rod 152 is placed and secured by a snap ring 154.

FIG. 7 is a cross-sectional view of the assembly associated with roller 120. Hydraulic motor assembly 144 is secured to shaft 142, which is mounted for rotation about bearings 156 and 158 in conventional manner. A gear 160 is mounted on the end of shaft 142 and enclosed within cover 162, providing a means for driving roller 122 in synchronism with roller 120. This gear is secured to axis 142 via set screw 164. As noted above, frame 140 is divided into two sections, one in which roller 120 generally operates and one in which roller 122 generally operates. It should also be further noted that each of the rollers structurally includes cavities to provide suitable lightness and rigidity of construction.

Further, in addition to the drive or operating surface 121 of roller 120 (which is that surface which slants in V-shaped cooperation toward the reduced dimension of roller 120), at the outside edges of roller 120 is a small bevel surface 123, which is discussed later.

On shaft 142 and operating within the cavity in which roller 122 operates is a split sleeve 166 secured via set screws 167 and 168. Each half of sleeve 166 includes two sets of sprockets or gear teeth 169 and 170 for operating a chain drive described below.

FIG. 8 shows roller 122 and related parts, roller 122 being mounted on axis 146 which rotates within bearings 172, 173 and 174, in conventional manner and similar to bearings 156 and 158 for roller 120. Roller 122 is similar in construction to 121, the operating face 175 slanting in cooperative relationship to the face 121 on roller 120, that is, together they form a V-shape supporting surface for a pipe.

Secured to one end of shaft 146 via a set screw 176 is a gear 178 which is driven through an intermediate gear by gear 160. Through this gear connection shaft 146 is rotated in synchronism with 120, gears 178 and 160 having the same number of teeth so as to provide no gear reduction or increase. Cover 162 extends not only over gear 160 but also includes the intermediate gear and gear 178 so as to provide dust-free protection of the entire gear assembly.

At the opposite end of shaft 146 from gear 178 within housing 180 is another gear assembly 182 for driving a tachometer to provide an indication of speed and a means for speed control. In FIG. 8, a pivot connection 130 is shown secured to frame 140. This pivot connection may merely be a post 184 extending through a frame projection and held by snap rings 186 and 187 at either end so as to permit rotation of post 184 within its connection. The pivot thus formed is the pivot to which the extending arm of piston assembly 126 is attached for turning the table (or frame) to which the rollers are mounted so that the rollers may spirally rotate the pipe.

Figure 9:
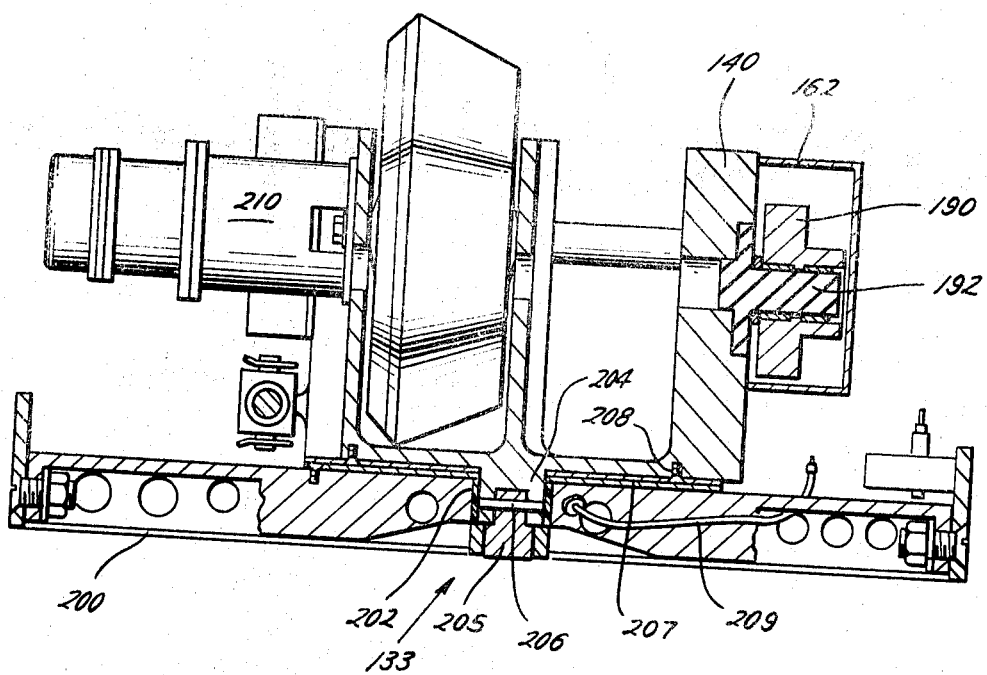
FIG. 9 is a cross-sectional view taken at line 9—9 in FIG. 6.

FIG. 9 shows a cross-sectional view of yet another part of the gear drive assembly for rotating roller 122. Idler gear 190 is mounted tabout an idler shaft 192 mounted for rotation within frame 140. This idler gear 190 mates with gear 160 mounted on the end of the shaft of roller 120 and gear 178 mounted on the end of the shaft of roller 122. Hence, as roller 120 rotates in a direction, looking at FIG. 7, from the bottom outward and around to the top, through idler gear 190, roller 122 in FIG. 8 also rotates from bottom outward and to the top, or in the same direction. Were no idler gear included in the assembly, then the rollers would try to roll in opposite directions, which is unsatisfactory for translating and rotating the pipe.

Also shown in FIG. 9 is pivot 133, which provides a means for rotating the roller set upon extension and retraction of the piston. In a conventional manner, mounted on a supporting frame 200 is a bushing 202 for receiving a projection 204 depending from frame 140. This depending portion 202 has a recess in the center thereof for receiving a plug 204 through which a lock pin 206 is placed to secure frame 140 within its rotating connection. Hence, it may be seen that frame 140 may rotate within bearing 202, as previously described.

A wear-resistant disk frame 207 mounted on the underside of frame 140 by screws 208 provides a wear-resistant surface between support frame 200 and frame 140 during rotation. Also shown in FIG. 9 is a hydraulic lead connection 209 that provides connection to the hydraulic motor assembly 144, previously discussed. Also, a tachometer 210, previously discussed, is connected to gear 182.

One feature of the opertaion of the equipment not previously discussed is that the bevel surfaces on the outside end (away from the axis of the pipe when the planes of the rollers are parallel therewith) of the rollers, such as surface 123 shown in FIG. 7, are included to provide a gradual entrance surface for longitudinally moving pipe. Actually, this edge is a circumferential bevel at the outside periphery of the roller about its axis. This bevel is reversedly slanted from the operating surface of the roller and at its largest or outside end.

When pipe 7 longitudinally is received on a set of rollers turned in the position shown in FIG. 5, it will initially encounter the slanted surfaces 123 and will not be suddenly bumped sideways by a sharp corner to be spun off the rollers or scarred thereby. Of course, the surface does not have to be beveled in this manner, but it has been found very useful in practice for smooth operation to include such beveling.

As shown in FIG. 5, each roller set is turned through an angle 132 to effect the desired spiralling of the pipe. This angle is settable by control 212, FIG. 6, which includes a scale having suitably settable automatic stops. The reason for making such control settable is to permit a different angle to be set in accordance with various sizes of pipe that might be inspected.

Sprockets 169 and 170, FIG. 7, for accommodating a chain drive assembly are to provide means for lashing together the various pairs of rollers for uniform drive. For instance, sprockets 169 may be connected with a chain for connection to the next pair of rollers longitudinally on one side and sprocket 170 may be connected with a chain for connection with the next pair of rollers longitudinally on the other side of the set illustrated.

Although only a unique, dual inspection electromagnetic apparatus has been illustrated and described in an actual commercial embodiment of the apparatus, if desired, it is possible to include other equipment mounted in conjunction therewith, such as a gamma ray wall thickness gauge.

While the drawings illustrate a preferred embodiment of the invention, which embodiment has been described in detail above, it is obvious that various substitutions or modifications of structures may be made without varying from the scope of the invention.

What is claimed is:

1. Apparatus for inspecting a ferromagnetic tubular member to detect inside and outside anomalies, and to detect with substantially equal sensitivity anomalies adjacent the inside and outside surfaces of the member, comprising:
   means for establishing a longitudinal magnetic field in a portion of a tubular member,
   first magnetic field detecting means disposed adjacent the outside surface of the tubular member at a portion thereof having the longitudinal magnetic field therein for producing an anomaly signal corresponding to a detected anomaly having a substantial transverse dimension in said member,
   second magnetic field detecting means disposed adjacent the inside surface of the tubular member at a portion thereof having the longitudinal magnetic field therein and in substantial axial alignment with said first magnetic field detecting means for producing an anomaly signal corresponding to a detected anomaly having a substantial transverse dimension in said member,
   means for translating the tubular member axially past said magnetic field establishing means and past said first and second magnetic field detecting means, and
   indicating means connected to said first and second magnetic field detecting means for providing respective indications of anomalies detected by the two detecting means.

2. The combination claimed in claim 1 wherein said means for establishing a longitudinal magnetic field in a portion of the tubular member establishes a longitudinal residual magnetic field therein,
   said first and second magnetic field detecting means being disposed in axially spaced relationship from said magnetic field establishing means to inspect portions of the pipe having said residual longitudinal magnetic field established therein.

3. Apparatus for inspecting a ferromagnetic tubular member to detect inside and outside anomalies and to detect with substantially equal sensitivity anomalies adjacent the inside and outside surfaces of the member, comprising:
   means for establishing a circumferential magnetic field in a portion of the tubular member,
   first magnetic field detecting means disposed adjacent the outside surface of the tubular member at the portion thereof having the circumferential magnetic field therein for producing an anomaly signal corresponding to a detected anomaly having a substantial longitudinal dimension in said member,
   second magnetic field detecting means disposed adjacent the inside surface of the tubular member at the portion thereof having the circumferential magnetic field therein and in substantial axial alignment with said first magnetic field detecting means for producing an anomaly signal corresponding to a detected anomaly having a substantial longitudinal dimension in said member,
   means for establishing a relative helical translatory motion between the tubular member and the said first and second magnetic field detecting means, and
   indicating means connected to said first and second magnetic field detecting means for providing respective indications of anomalies detected by the two detecting means.

4. Apparatus for inspecting a ferromagnetic tubular member to detect inside and outside anomalies and to detect with substantially equal sensitivity anomalies adjacent the inside and outside surfaces of the member, comprising:
   means for establishing a longitudinal magnetic field in a portion of a tubular member,
   first and second magnetic field detecting means disposed, respectively, adjacent the inside and outside surfaces of the tubular member at axially aligned positions adjacent the portion of the member having the longitudinal magnetic field therein for producing respective anomaly signals corresponding to detected anomalies having substantial transverse dimensions in said member,
   means for translating said tubular member axially past said first and second magnetic field detecting means,
   means for establishing a circumferential magnetic field in a portion of said member,
   said means for establishing a circumferential magnetic field being longitudinally displaced from the means for establishing a longitudinal magnetic field,
   third and fourth magnetic field detecting means disposed, respecitvely, adjacent the inside and outside surfaces of the tubular member at the position thereof having the circumferential magnetic field therein for producing respective anomaly signals corresponding to detected anomalies having substantial longitudinal dimensions in said member,
   means for establishing a relative helical translatory motion between the tubular member and said third and fourth magnetic field detecing means, and
   indicating means connected to said magnetic field detecting means for providing respective indications of anomalies detected by the detecting means.

5. The combination claimed in claim 4 wherein:
the means for translating the tubular member axially past said first and second magnetic field detecting means translates said member in a first axial direction with only a longitudinal motion, and
said means for establishing the relative helical translatory motion translates the member in the opposite axial direction.

6. Apparatus for inspecting a ferromagnetic tubular member to detect inside and outside anomalies and to detect with substantially equal sensitivity anomalies adjacent the inside and outside surfaces of the member, comprising
means for supporting an elongated ferromagnetic tubular member for translation along an axial path,
means at a first fixed location along said path for establishing a longitudinally directed magnetic field in said member,
a longitudinally extending lance axially centered along said path and adapted to permit a tubular member passing along the path to pass coaxially thereover,
a first plurality of flux leakage detector means disposed about said path at a first axial location,
said flux leakage detector means being adapted to engage 360° of the outer surface of the tubular member as it translates past said first location in a first axial direction thereby to produce anomaly signals corresponding to detected anomalies having a substantial transverse dimension in said member,
a second plurality of flux leakage detector means carried by said lance and disposed about the axis of said path at said first location,
said second flux leakage detector means being adapted to engage 360° of the inner surface of the tubular member as it is translated past said first location in said first axial direction, thereby to produce anomaly signals corresponding to detected anomalies having a substantial transverse dimension in said member,
means for translating said member in said first axial direction past said first location,
means at another fixed location along said path for establishing a circumferential magnetic field in said member,
third flux leakage detector means disposed proximate said path at a second axial location,
said third flux leakage detector means being adapted to engage the outer surface of the tubular member as it translates past the second location in the opposite axial direction thereby to produce anomaly signals corresponding to detected anomalies having a substantial longitudinal dimension in the said member,
fourth magnetic flux leakage detector means carried by said lance at the second axial location,
said fourth flux leakage detector means being adapted to engage the inside surface of the tubular member as it translates past the second axial location in said opposite direction thereby to produce anomaly signals corresponding to detected anomalies having a substantial longitudinal direction in said member,
means for helically translating said member past the second location and in said opposite axial direction, and
indicating means connected to all of said detector means and providing respective indications of anomalies detected by the detector means.

7. A method for inspecting a ferromagnetic tubular member to detect inside and outside anomalies and to detect with substantially equal sensitivity anomalies adjacent the inside and outside surfaces of the member, comprising the steps of longitudinally translating a tubular member through a zone,
establishing a longitudinal directed magnetic field in the wall of said member,
inspecting along the inside surface of the member to detect flux leakage resulting from a transversely extending anomaly interrupting lines of flux in said magnetic field and to produce anomaly signals corresponding to detected anomalies,
inspecting along the outside surface of the member simultaneously with the inspection along the inside surface to detect flux leakage resulting from a transversely extending anomaly interrupting lines of flux in said magnetic field and to produce anomaly signals corresponding to detected anomalies,
said two inspections being performed at substantially the same axial location relative to a translating member, and
providing an indication of respective anomaly signals resulting from said two inspections.

8. A method for inspecting a ferromagnetic tubular member to detect inside and outside anomalies and to detect with substantially equal sensitivity anomalies adjacent the inside and outside surfaces of the member, comprising the step of helically translating a tubular member through a zone,
establishing in said member a circumferential magnetic flux field as the member passes through said zone,
inspecting along the inside surface of the member to detect flux leakage resulting from a longitudinally extending anomaly interrupting lines of flux in said circumferential magnetic field and to produce anomaly signals corresponding to detected anomalies,
inspecting along the outside surface of the member simultaneously with the inspection along the inside surface to detect flux leakage resulting from a longitudinally extending anomaly interrupting lines of flux in said circumferential magnetic field and to produce anomaly signals corresponding to detected anomalies,
said two inspections be performed at substantially the same axial location relative to a translating member, and
providing an indication of respective anomaly signals resulting from said two inspections.

9. A method for inspecting a ferromagnetic tubular member to detect inside and outside anomalies and to detect with substantially equal sensitivity anomalies adjacent the inside and outside surfaces of the member comparing the steps of,
longitudinally translating a tubular member through a first zone,
establishing a longitudinally directed magnetic field in the wall of said member as it translates through said zone,
inspecting along the inside surface and the outside surface of the member to detect flux leakage resulting from transversely extending anomalies interrupting lines of flux in said magnetic field and to produce respective anomaly signals corresponding to detected anomalies,
establishing a circumferential magnetic flux field in the wall of said member as the member passes through a second zone that is axially displaced from said first zone,
inspecting along the inside and outside surfaces of the member to detect flux leakage adjacent the respective surfaces resulting from longitudinally extending anomalies interrupting lines of flux in said circumferential magnetic field and to produce respective anomaly signals corresponding to detected anomalies,
helically translating said tubular member through said second zone, and
providing respective indications of anomaly signals resulting from the respective inspections.

10. The method claimed in claim 9 which includes translating said member through said first zone in a first axial direction with only a longitudinal motion and helically translating the member through said second zone in the opposite axial direction.

References Cited

UNITED STATES PATENTS

| | | | |
|---|---|---|---|
| 2,124,579 | 7/1938 | Knerr et al. | 324—37 |
| 2,308,159 | 1/1943 | Drummond et al. | 324—37 |
| 2,881,387 | 4/1959 | Wood | 324—37 |
| 3,209,243 | 9/1965 | Walters et al. | 324—34 |
| 3,287,632 | 11/1966 | Tompkins | 324—37 |
| 3,341,771 | 9/1967 | Crouch et al. | 324—37 |
| 3,343,079 | 9/1967 | Crouch | 324—37 |

RUDOLPH V. ROLINEC, Primary Examiner

R. J. CORCORAN, Assistant Examiner